United States Patent

[11] 3,609,422

| [72] | Inventor | Robert W. Nordin<br>Chicago, Ill. |
|---|---|---|
| [21] | Appl. No. | 885,780 |
| [22] | Filed | Dec. 17, 1969 |
| [45] | Patented | Sept. 28, 1971 |
| [73] | Assignee | Teletype Corporation<br>Skokie, Ill. |

[54] WOBBLE ELEMENT MOTOR
27 Claims, 7 Drawing Figs.

[52] U.S. Cl. .................................................. 310/82,
310/49, 310/154, 310/266
[51] Int. Cl. ........................................................ H02k 7/06
[50] Field of Search .......................................... 310/49, 82,
268, 264, 265, 266, 267, 152, 154; 33/1 M; 74/60,
63, 1

[56] References Cited
UNITED STATES PATENTS

| 2,424,660 | 7/1947 | Howard .......................... | 74/60 |
| 3,447,469 | 6/1969 | Luing ............................. | 310/264 X |
| 3,487,246 | 12/1969 | Long .............................. | 310/268 X |
| 3,461,732 | 8/1969 | Gregory ......................... | 74/60 |
| 2,390,415 | 12/1945 | Bailey et al. ................... | 310/49 X |

FOREIGN PATENTS

| 227,019 | 5/1943 | Switzerland ................... | 310/82 |

*Primary Examiner*—D. F. Duggan
*Assistant Examiner*—B. A. Reynolds
*Attorneys*—J. L. Landis and R. P. Miller ABSTRACT: An inductance coil structure of spherical configuration comprises a movable element for driving the motor. It is wobbleably mounted concentrically of an angularly offset section of the output shaft of the motor for generating motor output torque responsively to the wobbling. A permanent magnet provides a spherical airgap within which magnetic flux induced by current flow in the coil structure coacts with the flux field of the magnet to wobble the movable element. Serially connected coils of said structure are disposed in opposed quadrants of the configuration to simultaneously push and pull the movable element and produce the wobble movement their in any selected direction, thereby to selectively vary the extent and direction of shaft movement about its axis of rotation.

PATENTED SEP 28 1971

INVENTOR
ROBERT W. NORDIN

BY Sherman P. Appel

ATTORNEY

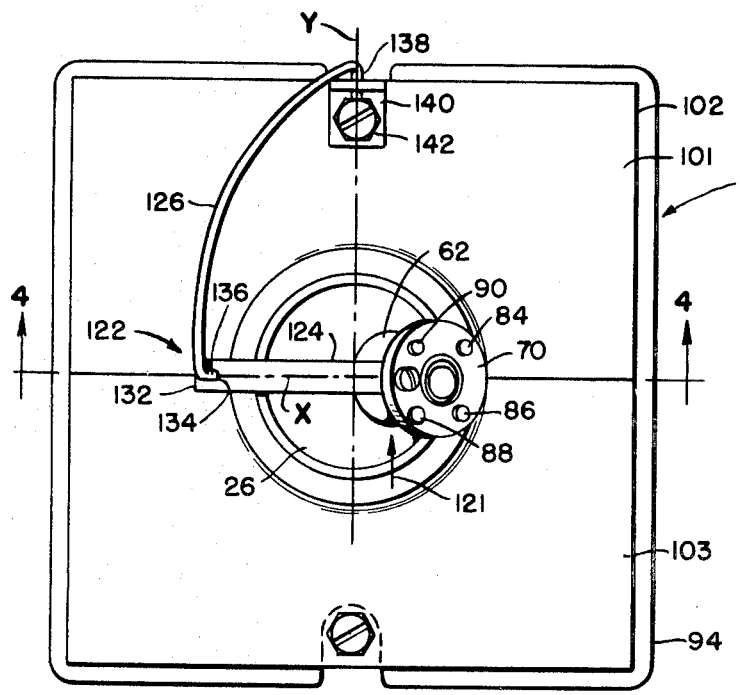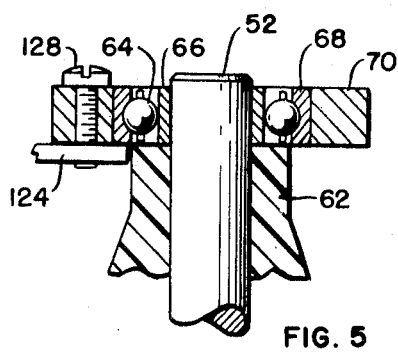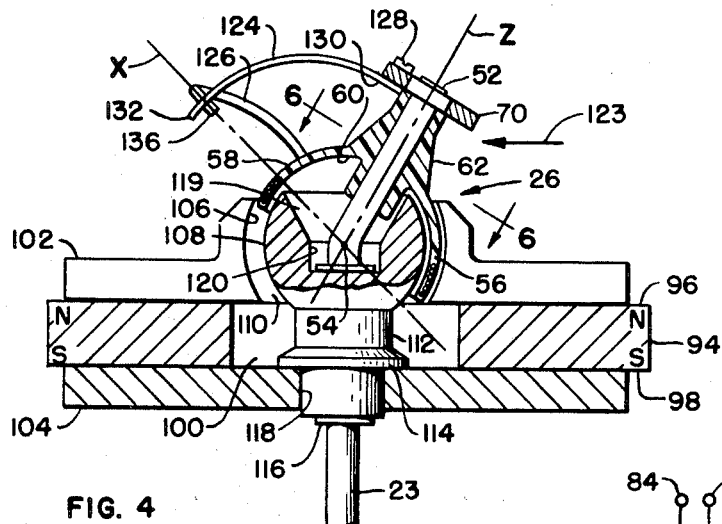

WOBBLE ELEMENT MOTOR

A spherical linkage having outer end portions connected to the movable element at the longitudinal axis of the shaft section and at a point remote from the movable element along another axis of the movable element, has a medial section pivoted at the third axis of said movable element to prevent rotation thereof about the axis through the shaft extension while permitting wobbling movement thereof in response to torque about the other of said axes.

BACKGROUND OF THE INVENTION

The present invention relates to a wobble element motor. A motor of the indicated class comprises a rotatable shaft which is operatively coupled to a movable element, the latter being mounted for wobbling about an offset or inclined cranklike shaft section or extension which revolves about the axis of the shaft as the shaft rotates. In such motors, movable elements of heretofore known design are discs, such as wobble or swash plates. They may be responsive electromagnetically, or mechanically through the agency of circumferentially spaced rods. If the movable element is responsive to forces for driving the motor shaft, the latter can generate an output torque angularly about its axis. In such event wobble may be produced by imposing forces on the movable element about two planar axes, orthogonal each to the other, and to the axis of the offset extension.

Motors of the indicated class, and in which the shaft is an output component, require relatively small energy input for overcoming motor inertia. Therefore, they can be advantageously and effectively used when high levels of resolution of analog outputs to inputs are required, such as for driving a type box for character selection in an automatic high-speed printer, or in an X-Y plotter for providing an angular drive to vertically adjust a record carrier or web to form a graph. However, these motors are also disadvantageous in that: (1.) Their movable elements tend to rotate about their offset shaft extensions in response to moving forces applied thereto; and such rotation is wasted for production of output. (2.) Their input elements are bulky.

Of the foregoing shortcomings, the prior art has afforded only scant, if any, recognition to the last problem. However, it has treated the matter of limiting motion of a movable element about the axis of its inclined shaft extension. The cost of expedients developed in the prior art for that purpose and the bulkiness of the required components coupled with the other shortcomings of the motors have tended substantially to limit their widespread commercial use.

It is an object of the present invention to provide an improved motor of the designated class.

It is another object of the invention to improve the means for preventing undesired movement of the wobbleable element in such motor.

It is a further object of the invention to minimize the size of such motor.

It is an additional object of the invention to maximize utilization of input energy for effecting movement of the wobbleable element of a motor of the described class.

SUMMARY OF THE INVENTION

To effect the foregoing, and other objects of the invention which will become apparent hereinafter, a motor has a spherical movable element which is mounted for wobbling about an axis inclined to the axis of its output shaft. Means are provided for generating a force field about the movable element. Also provided are means for producing a force to coact with said force field and develop a force vector tangent to the surface of said movable element for effecting wobbling thereof.

Considered from another, more limited aspect, the invention may be summarized as a motor as aforesaid in which its movable element comprises a plurality of electrically conductive coils paired in opposed quadrants of a sphere for simultaneously pushing and pulling to produce angular movement of the output shaft in a selected direction.

BRIEF DESCRIPTION OF THE DRAWINGS

In the ensuing description, reference is made to the accompanying drawings in which:

FIG. 3 is a top plan view of said motor;

FIG. 4 is a sectional view according to line 4—4 in FIG. 3;

FIG. 5 is an enlarged view of an upper portion of the motor and in the same plane as FIG. 4;

FIG. 6 is an enlarged view of a coil assembly comprising an input element of said motor and developed on a plane along line 6—6 of FIG. 4; and FIG. 7 is a scheme of the assembly shown in FIG. 6.

DETAILED DESCRIPTION OF THE ILLUSTRATED EMBODIMENTS OF THE INVENTION

Figure 1:
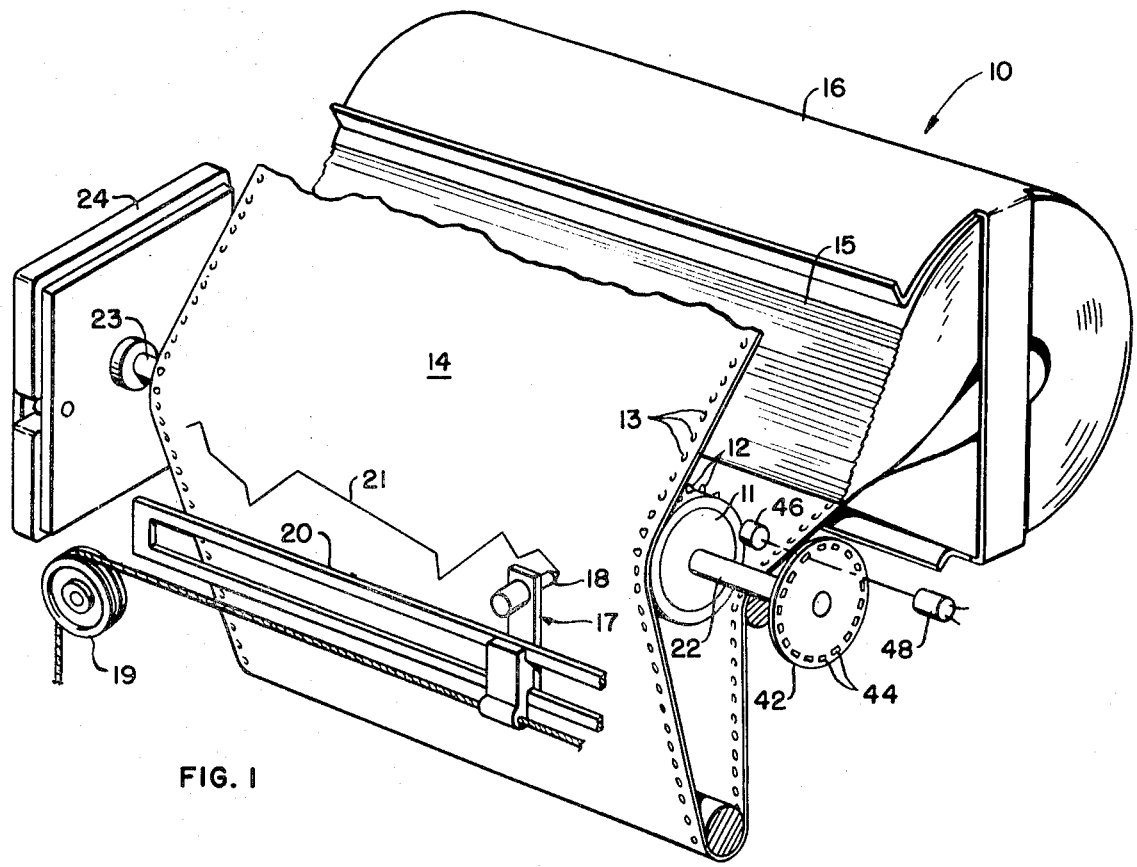
FIG. 1 is a perspective view of a scheme of any X-Y plotter having a motor embodying the present invention.

Referring now more particularly to FIG. 1, an X-Y plotter generally designated 10 comprises a horizontally stationary platen 11 which is rotationally arranged. Circumferentially spaced sprocket teeth 12 project from the platen into carrier or web apertures 13 (only some of which are numbered) for vertically adjusting a carrier or web 14 which is arranged for movement into the printing operation from a fan-folded inventory 15 stored in a container or magazine 16. An inscriber 17 may comprise an ink jet nozzle 18 having conventional ink supply means (not shown) and associated with carrier 14 for marking thereon in any known manner. Suitable means, only a pulley system 19 of which is shown herein, is arranged for driving inscriber 17 horizontally along a track 20 thereby to mark a transverse line 21 on web 14.

Vertical movement of web 14 and accordingly deflection of line 21 is achieved by selectively rocking platen 11 about its longitudinal axis. For such selective rocking exemplary platen 11 is mounted on a shaft 22 which is coupled by any conventional means to the coaxially disposed output or drive shaft 23 of a wobble element motor generally designated 24 and which embodies the present invention.

Figure 2:
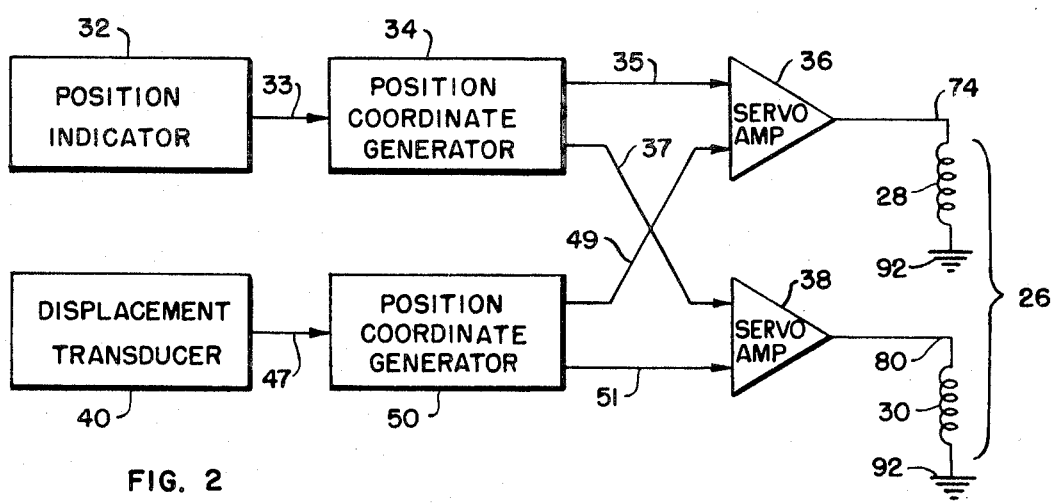
FIG. 2 is a scheme in block form of wiring suited for controlling the motor.

Output torque of motor 24 for rocking and accordingly the angular condition of its shaft 23 are, respectively analogs of an effect produced by and the position of a movable or input element generally designated 26 and herein comprised of two pairs 28 and 30 of electrical coils A, B, C, and D (FIGS. 2, 6, and 7). Movable or input element 26 is similar to a rotor in a conventional motor. That is to say, it is rotorlike, its movement producing an output torque. However, the movable or input element differs from a rotor in that it does not rotate. It does, however, cause shaft 23 to rotate. The effect produced by and the position of the movable element, inturn is responsive to and a result of a signal which may be from any well known position indicating mechanism. Herein such signal derives from control circuitry including feedback means and comprised of a position indicator 32 (FIG. 2) which is adapted to generate a composite effect analogous to an angular position to which it is desired to drive platen 11. Through a conductor 33 such composite effect is supplied as an input to a position coordinate generator 34. The latter produces a pair of component output currents which provide the inputs through a pair of conductors 35 and 37 to a pair of servoamplifiers 36 and 38. These in turn are connected respectively to coil pairs 28 and 30 for producing magnetomotive effects about coils A, B, C, and D.

In the illustrated plotter 10 the platen ceases to move vertically after each response to position indicator 32. Sensing or feedback means comprising displacement transducer 40 provide intelligence analogous to the angular condition of the platen which is considered in the circuitry in producing controlling effects for the shaft 23 and accordingly shaft 22. While the illustrated displacement transducer may be conventional, herein it is shown as including a disc 42 which is mounted for rotation with shaft 22 and has a plurality o annularly arranged encoding apertures 44 (only some of which are numbered). A light source 46 is fixed from angular movement for illuminating at least one aperture for each angular condition of shaft 22 to provide a corresponding encoded light which is registered by photosensor 48 to generate an associated output from displacement transducer 40. This last-mentioned output is connected to another position coordinator generator 50 through a conductor 47. Therein, by known means, it is divided into coordinate signals which are supplied as feedback signals to servoamplifiers 36 and 38 through a pair of leads 49 and 51. In each servoamplifier such signals are algebraically added for generating a resultant output to the pairs of coils 28 and 30 for driving platen 11 to any selected position.

Reference is now shifted to FIGS. 3–7, form FIG. 4 of which it is seen that the shaft 23 has an offset integral end input section or extension 52 with a longitudinal axis Z which is inclined from the axis of the shaft 23. The arrangement is such that axis Z intersects the longitudinal axis of the shaft at a point 54 defining a center about which movable element 26 is mounted for wobbling. In accordance with the present invention, the movable element has a spherical form with its center of curvature at point 54. The form is achieved by embedding coils A, B, C, and D in a cylindrical body or shell 56 which may be of plastic or other nonconductor, thereby also insulating each turn of wire of each coil from the others thereof.

Body 56 has an outer surface 58, an inner surface 60 and an integral projection 62 in the form of a truncated cone which is concentrically disposed about offset extension 52 to which said projection and accordingly movable element 26 is connected. Connection may be achieved through the agency of mounting means enabling universal movement, such as, for example, a ball bearing ring 64 (FIG. 5), the inner race 66 of which is secured to shaft extension 52, and the outer race 68 of which is secured to the inside of an end flange 70 which is integral with and projects radially from projection 62. The ball bearing ring comprises means enabling wobbly movement of the moveable element in response to torques about its three coordinate spatial axes X and Y and the aforesaid axis Z each of which is normal to the others. However, rotation about the Z-axis is restrained as will become apparent hereinafter.

As illustrated in FIG. 7, each coil is of general equilateral triangular configuration in a curved plane and is electrically connected with another as a pair in a series. That is to say, herein, coil pair 28 comprises coils A and B connected in series through a conductor 72. It has an input lead 74 which is connected to the output of servoamplifier 36 at a terminal 84, and a conductor 76 connected at terminal 86 to a plane of reference herein shown as ground 92 (FIG. 2). Coils C and D of coil pair 30 are serially connected through a conductor 78. Said last coil pair has an input lead 80 which is connected to the output of servoamplifier 38 at terminal 88 and a conductor 82 connected at a terminal 90 to ground 92. Each pair of coils is disposed in a pair of quadrants of body 56 with the coils of each pair being disposed in opposed quadrants. One leg of the triangular configuration of each coil is equatorially disposed; and the coils are substantially limited to one hemisphere of the cylindrical form of body 56.

In consequence of the foregoing, a given input to a coil pair simultaneously will induce thereabout a pair of magnetomotive fields of equal strengths and opposite polarities tending, when the device is operative, simultaneously magnetomatively to push and to pull movable element 26 with force vectors tangent to the surface of said element but from opposed quadrants by reason of torque generated in a common angular direction. Understanding of the concept is facilitated by referring to FIG. 6 and assuming an input to coil pair 28 (coils A and B) moving in the direction of arrows 81 and 83. Magnetomotive effects induced from nonequatorial legs of the coils will be canceling while effects induced from equatorial legs of the coils produce a pair of torques with a common angular direction though one pushes and the other pulls.

Conductors and leads 74, 76, 80, and 82 extend from the coils along projection 62. Said leads and conductors preferably insulatedly are embedded in the fabric of the projection. Terminals 84, 86, 88, and 90, to which said conductors and leads are connected, are supported form flange 70.

Means for generating a force field about movable element 26 comprises a permanent magnet assembly or stator comprised of a permanent magnet 94 in the form of a plate with a central aperture 100. The magnet is magnetized through its thickness such that one magnetic pole (herein shown as North and conventionally designated N) is at a face 96, and the other pole (herein shown as South and conventionally designated S) is at its opposite face 98.

An apertured pole piece 102 of magnetic material, such as soft iron, is rigidly secured to polar face 96. Another pole piece or pole element 104 also of magnetic material having an aperture 118 is rigidly secured to pole face 98 with its aperture in alignment with aperture 100. Pole element 102 is fashioned with a spherical medial shell socket or concavity 106 having a radius of curvature centered from point 54 which is longer than the radius of curvature of body 56. To facilitate assembly of the magnetic assembly and a magnetic ball or body 108, pole piece 102 may comprise a pair of abutting discrete sections 101 and 103.

Magnetic body 108 is spherical with a radius of curvature centered from point 54 and shorter than the radius of curvature of body 56. Accordingly, body 108 is disposed within and concentric to socket 106 with which it defines a spherical airgap 110 within which body 56 is wobblably disposed.

The magnetic polarity of body 108 is opposite to the polarity of socket 106. Its polarity derives from a magnetic stem 112 which extends through aperture 100 and has a flange 114 which is secured on pole piece 104 about aperture 118.

Output shaft 23 is journaled in a fixed hearing 116 which is disposed through aperture 118. Said shaft extends through stem 112 in concentric association therewith and into an opening or passage 120 through magnetic body 108. A conical portion 119 of passage 120 is proportioned for accommodating revolution of offset extension 52 about the axis of shaft 23. The latter is rockable about its axis to any selected angular position in consequence of a proper electrical current in the coils of input member 26 for inducing a corresponding magnetic flux to coact with the fixed permanent magnetic flux field in gap 110.

To appreciate the character of the wobble movement of movable element 26, assume an input torque thereon about the X-axis in a path in a plane normal to the X-axis applied to movable element 26 in the direction of arrow 121 (FIG. 3). Responsive movement of offset extension 52 in such plane is blocked because of the geometry of shaft 23 and said extension. The force, however, will be translated into an angular motion of the offset extension about the axis of rotation of said shaft and within bearing ring 64, thereby causing rotation of said shaft and dipping of body 56 such that, for example, the portion of body 56 appearing uppermost in FIG. 3 will be forced out of the plane of the view away form the viewer, while the hidden portion to the right will rock about the Y-axis into view.

Likewise, a torque applied to movable element 26 about the Y-axis, in a path in a plane normal to such axis, for example, according to arrow 123 (FIG. 4) would cause offset extension 52 to rock about the axis of shaft 23, said extension also moving angularly within bearing ring 64 and effect corresponding angular displacement of said shaft about its own axis. As a result, the shaft extension 52 would move out of the plane of FIG. 4 and the portion of body 56 out of said view and in the direction of movement would dip, while the right and left parts of body 56 appearing in FIG. 4 would shift, from down and up conditions, respectively, to up and down conditions.

A linkage generally designated 122 comprises means for restraining movement of movable element 26 in response to torque about the Z-axis while permitting the input element to move in response to torque about the X- and Y-axes. Said linkage is characterized by a first link 124 and a second link 126. Each of said links is disposed in a plane 90° from the plane of the other thereof and has an arcuate configuration concentric with the spherical form of body 56 on a radius which is larger than the radius of curvature of said body.

Link 124 is rigidly secured to body 56 by a suitable fastener 128 which connects the outer end portion 130 of said link to flange 70 about or adjacent the Z axis. At its opposite end portion 132, link 124 has an aperture 134 through which the X axis passes. Link 126 has a bent extension 136 which is axially coextensive with the X-axis and which is disposed in the aperture 134 whereby pivotal association about the X-axis of links 124 and 126 is effected. At its opposite end portion link 126 has a bent section 138 with an axis which is coextensive with the Y-axis. Extension 138 is pivotally received with aperture (unseen) in a bracket 140 relative which body 56 is moveable and which is fashioned to restrain movement of the link 126 in any direction except about the Y-axis. A fastener 142 of any suitable construction rigidly secures said bracket to pole piece 102 remote from body 156.

In consequence of the foregoing, linkage 122 may be characterized as having outer ends which are pivotally connected, respectively, to the spherical body 56 at one of its axes, and to a position remote form said body along another of its axes, with a medial section pivotally connected together along the third of the axes of said body. By reason of the linkage, body 56 is moveable in response to a torque about the X and Y-axis However, movement of body 56 will be restrained upon application of torque about the Z-axis.

While one of the coil sets 28 and 30 is sufficient to produce cycling of shaft 23, it is inefficient for that purpose. Maximum efficiency for shaft cycling is obtained with both of the coil sets 28 and 30 arranged as illustrated. Each angular condition of shaft 23 about its rotational axis can be achieved effectively either with a single current through one of the coil sets or a pair of currents through both coil sets varied according to the effect desired. The angular direction of movement of shaft 23, of course, is a function of direction of current flow, wobbling motion of movable element 26 resulting from vectors generated in airgap 110 and applied tangent to its convex surface 58.

As many modifications in the described construction could be conceived, and as many changes could be made therein without departing from the spirit and scope of the claims, it is intended that all matter contained in the accompanying specification shall be considered as illustrated only and not in a limiting sense.

I claim:

1. In a motor having a movable element which is wobblably mounted about an axis offset from the axis of rotation of an output shaft of said motor, an improvement wherein the movable element is spherical and characterized by:
   means for generating a force field about said movable element, and
   means for producing a force to coact with said force field and develop a force vector tangent to the surface of said movable element for effecting wobbling thereof.

2. A combination according to claim 1 wherein the generating mean comprises a magnetic stator the force field and force being magnetic.

3. A combination according to claim 1 wherein the generating means comprises a magnetic stator having a spherical gap disposed about said movable element.

4. A combination according to claim 3 wherein said movable element is spherical, and has inner and outer spherical surfaces disposed in said gap.

5. A combination according to claim 4 wherein the stator is a permanent magnet and comprises concentric convex and concave magnetic poles disposed within and without said movable elements.

6. A combination according to claim 1 wherein said producing means comprises a plurality of electrical inductance coils disposed spherically about said movable element.

7. A combination according to claim 6 wherein said coils are paired in opposed quadrants of said movable element for simultaneously pushing and pulling said movable element from opposed positions to effect angular movement of said shaft in a selected direction.

8. A combination according to claim 7 wherein said coils are limited to the equator and one hemisphere of said movable element.

9. A combination according to claim 8 wherein the coils are of generally triangular configuration.

10. A combination according to claim 7 wherein each coil of each pair is series-connected with the other thereof.

11. In a wobble drive motor of the type having an output shaft arranged for movement about its longitudinal axis and a section angularly offset from said shaft, the combination in an element arranged for wobbling on said section in association with movement of said shaft angularly about its axis, and comprising:
    a spherical shell;
    electrical coil means carried from said shell; and
    magnetic means mounted within and without said shell for generating a shell-driving torque upon passage of an electrical current in said electrical coil means.

12. A combination according to claim 11 wherein said coils are embedded in said shell for insulating adjoining coil loops one from another.

13. A combination according to claim 11 wherein said magnetic means comprises:
    a spherical magnetic body disposed within said shell and about said shaft and said input section and defining a first magnetic pole, and
    a magnetic member having a shell socket with a radius of curvature on a center common with the radius of curvature of said spherical magnetic body and defining a second magnetic pole outside said shell.

14. A combination according to claim 13 wherein said magnetic means further comprises:
    an apertured permanent magnet;
    an apertured pole piece secured from one pole of said permanent magnet; and
    a magnetic stem secured to said pole piece and extending through the aperture in said magnet in supportive association with said spherical magnetic body.

15. A combination according to claim 14 wherein said magnetic member is a polar element secured from the other pole of said permanent magnet.

16. In a motor wherein a magnetic movable element is arranged for wobbling about the offset end section of an output shaft for production of output torque about the axis of said shaft and in response to magnetic flux variation, the improvement in a stator comprising:
    an apertured permanent magnet with opposed polar faces;
    a first pole piece connected to one of the faces of said permanent magnet and disposed adjacent said movable element;
    a second pole piece having an opening aligned with the aperture in said permanent magnet and connected to the other of the faces thereof;
    a polar extension from said first pole piece projecting through the aperture in said permanent magnet and having a part disposed in said opening; and
    means for generating a force in coaction with the flux field of said permanent magnet to wobble said movable element.

17. A combination according to claim 16 wherein said generating means comprises electrical coil means connected to said movable element.

18. A combination according to claim 16 wherein said polar extension and said second pole piece define an airgap, said movable element disposed in said airgap.

19. A combination according to claim 16 wherein the output shaft projects through the aperture in said permanent magnet and said polar extension.

20. A combination according to claim 19 characterized by a shaft bearing secured in first pole piece.

21. A combination according to claim 19 characterized in that said offset end portion is bent from said shaft in said part.

22. A combination according to claim 21 wherein said part is a spherical body having a passage therethrough for said shaft with a conical section for said extension.

23. In a motor wherein torque is produced by applying a force to an output shaft extension inclined to the axis of a shaft producing the torque, an improvement comprising:

a spherical body having a center of curvature defined by the intersection of the axes of said shaft and said shaft extension;

a mounting component from said body disposed about said shaft extension;

universal moving means associated with said mounting component for enabling transmission of force from said body to said shaft extension; and means for restraining movement of said body about the axis of said shaft extension.

24. A combination according to claim 23 wherein said mounting component comprises a projection from said body concentric with said shaft extension.

25. A combination according to claim 24 wherein said projection is in the form of a truncated cone.

26. A combination according to claim 24 wherein said universal moving means comprises a bearing assembly arranged about said shaft extension in engagement with said projection at a position remote from said body for enabling relative movement of said body and said shaft extension.

27. A combination according to claim 26 wherein the restraining means includes:

an arcuate linkage having a first end portion secured to said projection about said bearing means, a second end portion connected at a fixed position remote from said body for enabling motion of said body in response to a torque about one of the axes of said body and preventing motion of said body in response to a torque about another of its axes, and a medial pivotally linked portion for enabling movement of said body in response to torque about the third of the axes of said body.